United States Patent [19]

Cycyk et al.

[11] Patent Number: 4,619,192

[45] Date of Patent: Oct. 28, 1986

[54] POTATO CUTTER

[76] Inventors: Michael A. Cycyk, 265 N. Payne Ave., N. Tonawanda, N.Y. 14120; Robert R. Seitz, 115 Albert Ave., Buffalo, N.Y. 14207

[21] Appl. No.: 679,392

[22] Filed: Dec. 7, 1984

[51] Int. Cl.[4] .......................... A23L 1/212; A23P 1/00

[52] U.S. Cl. ........................................ 99/538; 99/537; 99/595

[58] Field of Search ................. 99/537, 538, 567, 592, 99/594, 589; 83/425.1, 733, 56; 426/615, 637, 518, 512

[56] References Cited

U.S. PATENT DOCUMENTS 2,464,933 3/1949 Ross ................................. 99/589 X
2,489,581 11/1949 Mason ............................... 99/537 X
3,211,202 10/1965 Mason ................................... 99/592
4,387,111 6/1983 Mullender ........................ 99/538 X

FOREIGN PATENT DOCUMENTS 2605682 8/1977 Fed. Rep. of Germany ........ 99/537

*Primary Examiner*—Timothy F. Simone
*Attorney, Agent, or Firm*—James J. Ralabate

[57] ABSTRACT

This invention involves a device for automatically cutting a potato or similar edible tubers into a shoe string form. The cutting device utilizes the entire potato during the cutting operation by the use of a novel potato support and receiving and cutting structures which are adapted to mate with the turning means which rotates the potato along the fixed axis.

17 Claims, 6 Drawing Figures

POTATO CUTTER

This invention relates to food processing equipment and more specifically to a device for shoe string cutting of edible tubers such as potatoes.

BACKGROUND OF THE INVENTION

It is known to cut bulbous foods in various shapes by a variety of food processing equipment. One of the most common devices used is the potato cutting equipment that produces french fries and other similar potato cuts. These cuts generally involve cutting the potato into longitudinal cuboids of various configurations. There are devices that cut the potato into flat french fries, wavy french fries, spiral shaped and many other related forms.

One of the more difficult potato cuts to effectuate in an economical fashion is the so-called shoe string cut. A problem that has been encountered in this type of cut is to find a system that will use the complete potato in order to avoid waste. Various helical or spiral-shaped food cutters are known that use the entire potato but not devices that cut the potato into a shoe string configuration. In U.S. Pat. No. 4,387,111 a device is disclosed wherein a helical or spiral-shaped bulbous food product is produced. In this patent a food product made from a vegetable such as a potato is produced by means of being cut in a way that a helical or spiral ribbon results. This ribbon has a series of loops around a center whereby the loops define a space from each other. This space corresponds to the shape of the loops and is filled with one or more similar helical or spiral ribbons. While this device utilized substantially the complete potato it is limited to cutting or preparing only spiral-shaped food. In U.S. Pat. No. 3,830,151 a sectioning device is disclosed for cutting various foods such as lemons, apples or tomatoes. Again, this device is limited in the form that it cuts the food. A rounded food article is divided by this prior art device into a number of radial sections by forcing it through a conical array of radial blades above which it is impaled on a wedge-shaped spike. The article is manually forced through the wedge-shaped spaces between the blades by an annular array of tapered wedge-shaped fingers depending from a head to which an operating handle is attached. The rounded food article processed by this prior art device is thus divided into a number of radial sections by the downward action of the plunger which forces it against the blades.

In U.S. Pat. Nos. 2,464,993 and 2,489,581 devices are disclosed for cutting fruits and vegetables into various forms. In U.S. Pat. No. 2,464,993 a device is described which can be used to produce shoe string potatoes by manually turning a handle means which rotates the potato upon fixed cutting means such as blades. This device is provided with a plurality of short blades or knives which cut into the potato along a radius extending from the rotation axis of the potato. Thus, the potato is sliced into long strips or shoe strings. The potato is impaled upon a pointed stud fixed to the rear portion of the device. The front portion of the potato is positioned against a plate having outwardly projecting teeth to hold the potato in place. Since the device requires both the fixed pointed stud and the projecting teeth on the plate, it is impossible to use the entire potato in the shoe-stringing operation. Thus, the most economical shoe-stringing process is not provided for in this prior art device. U.S. Pat. No. 2,489,581 is similar in its disclosure to U.S. Pat. No. 2,464,993 except in U.S. Pat. No. 2,489,581 various cuts can be accomplished. It has, however, the same drawback as the device of U.S. Pat. No. 2,489,581 in that the entire potato cannot be used up or consumed in the cutting operation therefore resulting in a less than optimum economic procedure.

SUMMARY OF THE INVENTION

It is therefore an object of this invention to provide a potato shoe-stringing device devoid of the above-noted disadvantages.

Another object of this invention is to provide a cutter for bulbous food products wherein the entire food product is used up or consumed in the automatic cutting operation.

Another further object of this invention is to provide a food processing device capable of cutting an entire potato or similar food into a shoe string configuration.

A further object of this invention is to provide a potato-cutting device that cuts the potato into a configuration of substantially uniform dimensions.

A still further object of this invention is to provide a potato cutter that avoids waste and is convenient to use.

Another object of this invention is to provide a device that is automatic and produces a reliably consistent product.

Another still further object of this invention is to provide a portable shoe-stringing machine for cutting bulbous foods in their entirety.

Yet another object of this invention is to provide a shoe-stringing machine for cutting bulbous foods wherein the dimensions of the cut food can be easily varied.

The foregoing objects and others are accomplished in accordance with this invention by providing a device for cutting a potato or similar food into a shoe string form while using and consuming the entire potato in the cutting operation. This is accomplished by rotating a potato around a centrally-positioned bullet nose or retaining means having a cutting blade and slitting fingers located adjacent said bullet nose. As the potato is rotated along the axis provided by the centering bullet nose, the cutting blade and slitting fingers cut the potato into a shoe string form. As the potato is progressively consumed in this cutting operation, the stripper assembly is advancing forward approaching the blade and fingers. At this point in the cutting operation, a stripper plate slides over the drive fingers that hold the potato at the end furthest from the cutting blade when extended pushing the potato forward. This forces the remainder of the potato through the cutting blade and permits the axial bullet nose to project into an opening in the stripper plate. In addition, circular grooves are cut in the stripper plate to provide clearance for the slitting fingers.

The operator of the device of this invention can easily cut an entire potato into shoe string form by the following simple procedure. The operator merely impales the potato onto the bullet nose and slides the motor box forward forcing the stripper plate to retract back and exposing the drive fingers which engage the potato. This stripper assembly is axially mounted on on the end of a turn or rotating rod which is screw threaded to a position behind said stripper assembly. As a motor which drives said rotating rod is activated, the solenoid is also activated which engages the split nut to the rotating threaded rod, the rotating rod advances the stripper assembly with attached potato through the cutting blade and slitting fingers. As the stripper assembly nears the end of the cutting cycle the stripper assembly decompresses forcing the remainder of the potato off the drive finger through the blade and slitting fingers thus consuming the complete potato. A hole and circular grooves in the stripper plate provide clearance for the bullet nose and the slitting fingers. The operator then pulls the motor box backwards and is ready to load the next potato.

The stripper assembly comprises a front stripper plate movably attached to a stripper main body by two or more stripper bolts, also a back plate mounted to the stripper main body which screws the stripper assembly to the drive rod. In cooperation with said stripper bolts are plate advancing means such as springs that project said plate out from said main body during the final portion of the cutting operation. In the center portion of the main body and projecting therefrom are a plurality of drive fingers which hold the potato in place during the cutting operation. Disposed centrally to the fingers is a plate aperture adapted to receive the bullet nose at the end of the cutting cycle, also circular grooves in the plate to provide clearance for the slitting fingers which permits the entire potato to be cut.

In devices heretofore used, the prong or nose holding the potato or other bulbous food would interfere with consuming of the entire potato and the potato equal to the length of this holding prong would remain to be cut by hand or discarded. The present invention provides means whereby the entire potato is cut into shoe string form in a simple and economical automatic cutting operation. The reason the entire potato can be cut is because of the structure of the stripper mechanism above described and to be further described in reference to the drawings. There are various forms of strippers that can be used in the present invention; for example, a spring-loaded stripper and hydraulically operated stripper. In the spring-loaded stripper when the machine is loaded with the potato, the stripper plate is forced back thus compressing the springs located behind the stripper bolts. These springs are held compressed by the forward motion of the feed screw. At the end of the feed cycle the screw stops its forward motion but continues to rotate and the springs begin to decompress moving the stripper plate forward to feed the remainder of the potato through the cutter. The hydraulic stripper embodiment is similar and will be described in detail in the ensuing description of the drawings.

DESCRIPTION OF THE DRAWING AND OF THE PRFERRED EMBODIMENTS

Figures 1, 2, 3:
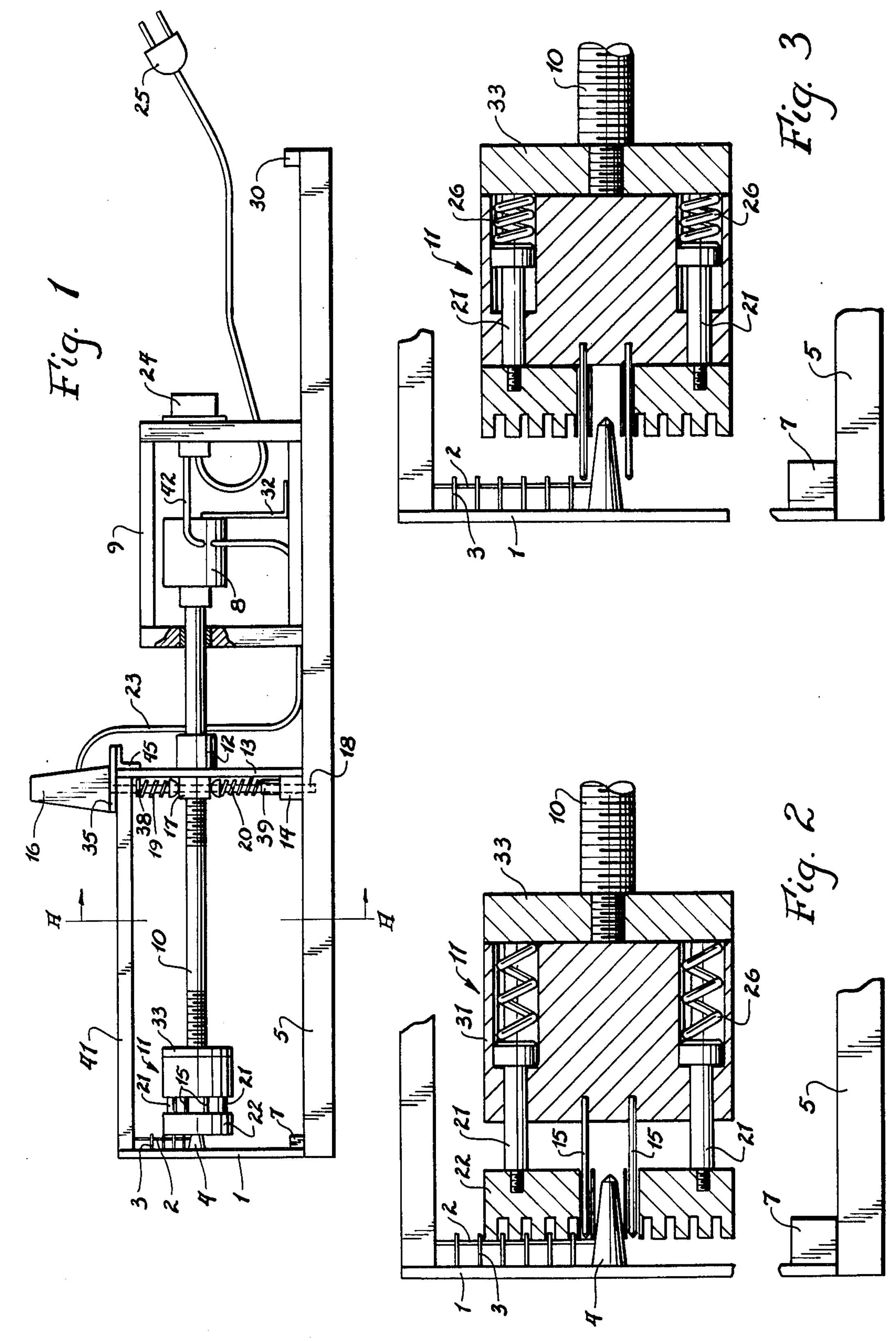
FIG. 1 is a side perspective view of the entire device of this invention.
FIG. 2 is a cross-sectional view of the spring stripper plate assembly in its extended position.
FIG. 3 is a cross-sectional view of the spring stripper plate assembly in its compressed position.

In FIG. 1 the cutting device of this invention is illustrated having an end plate 1 to which is attached a cutting blade 2 and slitting fingers 3, also bullet nose 4. The end plate 1 is secured to the main supports 5 and 6 (shown in FIG. 6) by bracket 7. Motor 8 is mounted in motor box 9 by use of motor support bracket 32. Motor 8 is adapted to turn drive rod or screw 10. Drive rod or screw 10 is operationally connected to motor 8 at one end and to stripper assembly 11 at the opposite end by means of back plate 33 for the spring stripper or back plate 43 and screws 34 for the hydraulic stripper (of FIGS. 4 and 5). Drive rod or screw 10 passes through support bushing 12 which is mounted on plate 13 which is secured to main supports 5 and 6 (see FIG. 6) by bracket 14 and tied into plate 1 by brace 41. The potato to be cut is impaled on the bullet nose 4 and the motor box 9 is pushed forward forcing the stripper plate 22 back and exposing drive fingers 15 to engage the potato. Then the device of this invention is ready to begin the automatic cutting cycle. A solenoid 16 is mounted in operational proximity to the turn screw 10. The purpose of solenoid 16 is to engage or disengage split-nut 17 into turn screw 10. This is accomplished through rod 18 and springs 19 and 20. Stripper bolts 21 are provided in the stripper main body assembly 11 and are adapted to project stripper plate 22 forward during the last portion of the feed cycle. These stripper bolts 21 are movably positioned in piston-like fashion into the body of main stripper assembly 11 and are compressed or extended outwardly by means such as springs or hydraulic means or the like. Clearance is provided in the stripper plate 22 for bullet nose 4 and slitting fingers 3. Any suitable motor 8 or solenoid 16 may be used in the device of this invention; typical motors 8 are the ones found in various electric hand drills. Solenoid 16 is electrically connected to motor 8 by wire 23 and motor 8 is connected to switch 24 by wire 42. Plug outlet 25 is adapted to plug into an electrical outlet for the source of energy. Motor 8 is mounted in motor box 9 to protect the motor structure from damage during use and storage.

In operation the potato to be cut is impaled on bullet nose 4 and motor box 9 is pushed forward sliding on main supports 5 and 6 and forcing the stripper assembly 11 toward the potato. As contact is made with the potato the forward motion of the stripper assembly 11 causes the stripper plate 22 to move back which is guided by the stripper bolts 21 exposing the drive fingers 15 which engage the potato. The cutting operation is now ready to begin.

In FIGS. 2 and 3 the spring stripper embodiment of this invention is illustrated. The operator impales the potato on the bullet nose 4 and pushes motor box 9 forward which slides on main supports 5 and 6 (as viewed in FIG. 6). Turn screw 10 which is operationally connected to motor 8 is guided while being moved forward by bushing 12. Stripper assembly 11 which is connected to turn screw 10 by back plate 33 moves forward until stripper plate 22 contacts potato. Stripper assembly 11 is now in the extended position as shown in FIG. 2. Stripper plate 22 and stripper bolts 21 stop their forward motion and the rest of the stripper assembly which consists of main body 31, back plate 33, springs 26, and drive fingers 15 continue to move forward causing drive fingers 15 to move through clearance holes in stripper plate 22 and into the potato, also turn screw 10 and motor box 9 continue to move forward till stripper plate 22 is completely moved back against the main body 31 of the stripper assembly 11, and drive fingers 15 have completely penetrated potato. At this point springs 26 which are encapsulated in main body 31 are compressed between back plate 33 and head of stripper bolts 21 which were forced back by contact with the potato. Stripper assembly 11 is now in a compressed position as shown in FIG. 3. At this point the operator energizes the push button 24 which energizes solenoid 16 and motor 8 causing turn screw 10 and stripper assembly 11 to begin to rotate, also energizing solenoid 16 causes split-nut 17 to engage turn screw 10 which causes the forward motion of turn screw 10, motor box 9 and stripper assembly 11, the forward motion keeps the stripper assembly 11 in a compressed position. Motor box 9, turn screw 10 and stripper assembly 11 continue their forward motion until the under cut of turn screw 10 is aligned with split-nut 17. At this point motor box 9 turn screw 10 and stripper assembly 11 stops its forward motion but turn screw 10 and stripper assembly 11 continue to rotate. Because of the lack of forward motion springs 26 which were being held compressed by that forward motion begin to decompress, causing stripper bolts 21 and stripper plate 22 to move forward. The forward action of the stripper plate 22 causes the potato to be pushed off the drive fingers 15. Stripper plate 22 moves forward to a point beyond the slitting fingers 3 and even with cutting blade 2. The clearance hole or chamber 44 in the stripper plate 22 allows the stripper plate 22 to move over the bullet nose 4, also clearance grooves in the stripper plate 22 are provided to allow stripper plate 22 to move to a point beyond the slitting fingers 3 causing the entire potato to be consumed in the cutting operation. At this point operator de-energizes push button 24 which de-energizes solenoid 16 and motor 8 which causes rotation to stop and split-nut 17 to return to a disengaged position because of return spring 20. At this point operator can pull back motor box 9 turn screw 10 and stripper assembly 11 till it hits the return stop 30. Stripper assembly 11 is now in the extended position as shown in FIG. 2.

Figure 5:
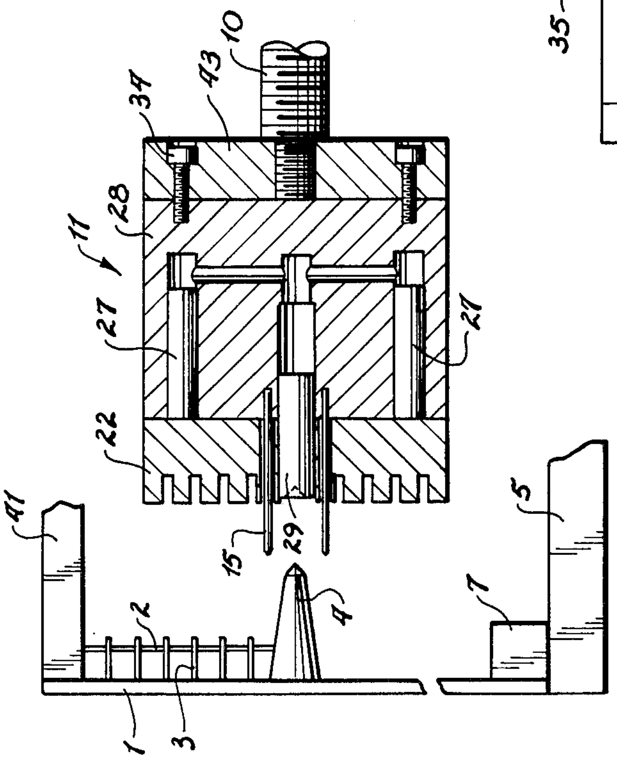
FIG. 5 is a cross-sectional view of the hydraulic stripper plate assembly in its compressed position.
Figure 4:
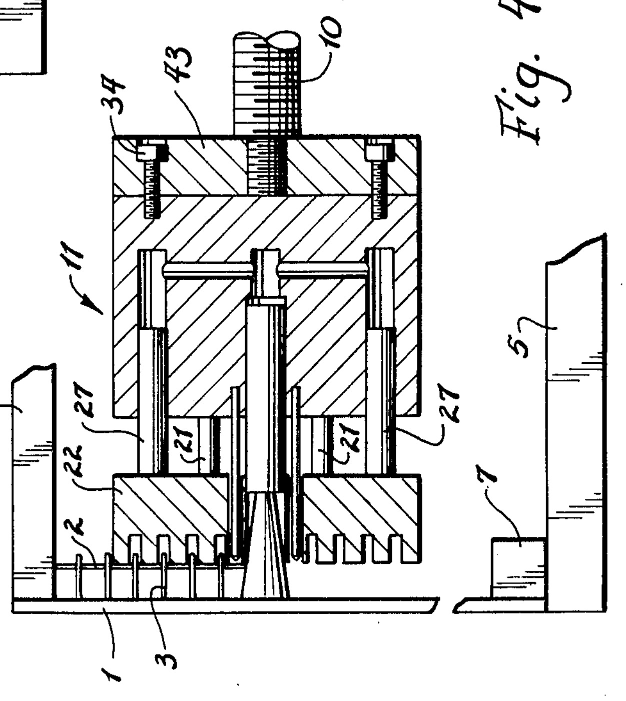
FIG. 4 is a cross-sectional view of the hydraulic stripper plate assembly in its extended position.

FIG. 4 is a cross-sectional view of the hydraulic stripper assembly in its extended position and FIG. 5 is a cross-sectional view of this assembly in its compressed state. The operator impales the potato on the bullet nose 4 and pushes motor box 9 forward which slides on main supports 5 and 6. Turn screw 10 which is operationally connected to motor 8 is guided while being moved forward by bushing 12 stripper assembly 11 which is connected to turn screw 10 by back plate 43 moves forward till stripper plate 22 contacts the potato. Stripper assembly 11 is now in the extended position as shown in FIG. 4. Stripper plate 22, stripper bolts 21 and secondary pistons 27 stop their forward motion. The forward motion of the main body 28 continues causing the hydraulic fluid behind secondary pistons 27 to be forced into the passageways of main body 28 to force main piston 29 forward. Also drive fingers 15 move forward through clearance holes in stripper plate 22 and into the potato also turn screw 10 and motor box 9 continue to move forward till stripper plate 22 is completely moved back against the main body 28 of stripper assembly 11 and drive fingers 15 have completely penetrated the potato. Stripper assembly 11 is now in the compressed position as shown in FIG. 5. At this point the operator energizes the push button 24 which energizes the solenoid 16 and motor 8 causing turn screw 10 and stripper assembly to begin to rotate. Also energizing solenoid 16 causes split-nut 17 to engage turn screw 10 which causes the forward motion of turn screw 10 motor box 9 and stripper assembly 11, it continues to move forward until bullet nose 4 passes through clearance hole in stripper plate 22 and contacts main piston 29 and continues to move forward forcing hydraulic fluid through passages in main body 28 applying pressure behind secondary pistons 27 causing them and stripper plate 22 and stripper bolts 21 to begin to move forward away from main body 28. Motor box 9 turns screw 10 and stripper assembly 11 move forward at the same time the stripper plate 22 moves away from the main body 28 of the stripper assembly 11 forcing the potato off the drive fingers 15. Stripper plate 22 moves forward at a rate faster than the main body 28 to a point beyond the slitting fingers 3 and even with cutting blade 2. The linear movement of the main piston 29 is equal to the linear movement of the secondary pistons 27 because the surface area of the main piston 29 is equal to the total surface area of the secondary pistons 27. Clearance grooves in the stripper plate 22 are provided to allow stripper plate 22 to move to a point beyond the slitting fingers 3 causing the entire potato to be consumed in the cutting operation. When under cut of turn screw 10 becomes aligned with split-nut 17 motor box 9 turn screw 10 and stripper assembly 11 stop their forward motion; at this point the stripper plate 22 is fully extended. Also at this point operator de-energizes push button 24 which de-energizes solenoid 16 and motor 8 which causes rotation to stop and split-nut 17 to return to a disengaged position because of return spring 20. At this point operator can pull back motor box 9, turn screw 10 and stripper assembly 11 until it hits return stop 30. Stripper assembly 11 is now in the extended position as shown in FIG. 4.

As noted, the forward motion of the complete stripper assembly brings bullet nose or pilot 4 through chamber 44 and into contact with main piston 29 the forward motion continues and drives main piston 29 into the main body 28 which causes the oil or grease in the passages to force the secondary piston 27 outward thus causing the stripper plate 22 which is guided by stripper bolts 21 to be forced outward thus stripping the potato off drive fingers 15 into cutting blade 2 and slitting fingers 3. The circular grooves are cut in the stripper plate 22 to allow clearance for the slitting finger 3. The hole or chamber 44 in the center of the stripper plate 22 is for main piston 29 to fit into and the pilot 4 to pass through.

As described, the potato has been impaled on the pilot or bullet nose 4 and motor box 9 (shown in FIG. 1) has been pushed forward causing drive fingers 15 to impale the other end of the potato. In FIG. 5 stripper plate 22 guided by stripper bolts 21 has been forced back toward the main body 28 which is attached to back plate 43 by screws 34 and back plate 43 is attached to drive screw 10 by means of a thread. Also, when stripper plate 22 is forced back toward main body 28 the secondary pistons 27 are forced into the main body 28 causing oil or grease in the passages to force the main piston 29 outward into the hole in the stripper plate 22. When the potato is impaled on drive fingers 15 and stripper plate 22 has been forced back being guided by the stripper bolts 21 this causes the secondary pistons 27 to fully seat in the main body 28 which causes the oil or grease in the passages in the main body 28 to force the main piston 29 to be fully extended.

As push button 24 is energized the motor 8 rotates and solenoid 16 is energized.

Figure 6:
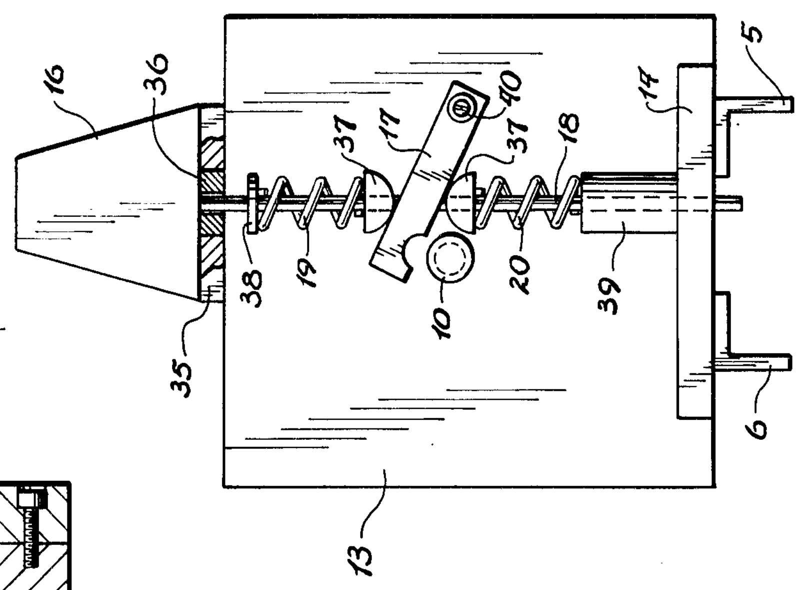
FIG. 6 is a sectional view of the device of this invention illustrated in FIG. 1 taken across line A—A.

FIG. 6 is a sectional view of the device of this invention illustrated in FIG. 1 at area A—A.

Solenoid 16 is mounted to plate 35 which is secured to plate 13 by bracket 45. Bushing 36 is mounted in plate 35. Collar 38 is attached to rod 18. As solenoid 16 is energized rod 18 is forced downward being guided by bushing 36 and a hole in brace 14. As rod 18 is forced downward collar 38 begins to compress spring 19 which pushes against spacer 37 and split-nut 17 causing spring 20 to compress. The pressure created by spring 19 when compressed is greater than the pressure created by spring 20 when compressed so split-nut 17 which pivots on shoulder bolt 40 will engage drive screw 10. At the end of the cutting cycle solenoid 16 is de-energized. When this happens the pressure of spring 20 is greater than the pressure of spring 19 thus forcing split-nut 17 to pivot on shoulder screw 40 upward as to disengage drive screw 10. Another purpose of spring 19 is to stop the forward motion of the drive screw 10 if an operational problem develops. In this event the split-nut 17 would be able to slip on drive screw 10 thus stopping further damage to the machine. Drive screw 10 passes through support bushing 12 which is mounted on plate 13 which is secured to main supports 5 and 6 by bracket 14 and tied into plate 1 by brace 41.

The preferred and optimumly preferred embodiments of the present invention have been described herein and shown in the accompanying drawing to illustrate the underlying principles of the invention. It is to be understood, however, that numerous modifications and ramifications may be made without departing from the spirit and scope of this invention.

What is claimed is:

1. A potato cutting device capable of cutting an entire potato into a shoe-string form which comprises in combination a source of energy, a drive rod attached at one end to said source of energy, a receiving chamber, a cutting means, a prong potato-holding means and a stripper plate assembly attached to the opposite end of said drive rod, said stripper plate assembly comprising at least two drive fingers adapted to penetrate and support a potato and a main body having movably connected thereto at least two stripper bolt means, said stripper bolt means having attached at its outer end a stripper plate, said bolt means adapted to selectively move said stripper plate toward said cutting means thereby adapted to push a potato off said drive fingers and cause the entire potato to be consumed in said cutting operation, located and provided in substantially the center of said stripper plate are stripper fingers positioned around a receiving chamber, said chamber adapted to mate with said potato prong-holding means which is located adjacent said cutting means.

2. The device of claim 1 wherein said stripper plate assembly is adapted to rotate as it approaches said potato prong-holding means.

3. The device of claim 1 wherein said stripper plate is adapted to be projected forward by spring means in functional contact therewith.

4. The device of claim 1 wherein said stripper plate has bolt means in contact with it, said bolt means having in cooperation therewith spring means.

5. The device of claim 1 wherein said stripper plate is adapted to be projected forward by hydraulic means.

6. The device of claim 1 wherein said prong-holding means is adapted to project into said receiving aperture when said potato is substantially consumed, said receiving aperture formed by at least two said drive fingers which are positioned above and below said aperture.

7. The device of claim 1 wherein the outer portions of said drive fingers project beyond the outer surface of said stripper plate when said stripper is in its compressed position and extend even with the outer surface of said stripper plate when it is in its extended position.

8. The device of claim 1 wherein the outer surface of said drive plate and the outer portions of said stripper fingers are adapted to be located immediately adjacent the surface of said cutting means at the end of the cutting cycle.

9. The device of claim 1 wherein said stripper plate assembly is rotatable around the axis of said potato prong-holding means.

10. The device of claim 1 wherein said stripper plate assembly is adapted to move rotably forward progressively forcing thereby an entire potato against said cutting means, and wherein said cutting means are adapted to cut substantially the entire potato during a cutting operation.

11. A potato cutting device capable of cutting an entire potato into a shoe string form which comprises in combination a source of energy, a drive rod attached at one end to said source of energy, a stripper plate assembly attached to the opposite end of said drive rod and in close proximity to a cutting means, a solenoid to engage and disengage means to feed the drive rod, said stripper plate assembly comprising a main body having movably connected thereto at least one bolt means, said bolt means having attached at its opposite end a stripper plate, said bolt means adapted to move said stripper plate toward and away from said cutting means and said main body, and located and projecting from substantially the center of said stripper plate are at least two drive fingers having formed therebetween a receiving aperture to mate with a prong-holding means located adjacent said cutting means and circular grooves in the stripper plate to provide clearance for the slitting fingers, said stripper plate adapted to push a potato off said drive fingers and cause the entire potato to be consumed in said cutting operation.

12. The device of claim 11 wherein said stripper plate assembly is adapted to rotate as it approaches said potato prong-holding means and cutting means.

13. The device of claim 11 wherein said stripper plate is adapted to be projected forward by spring means in contact therewith.

14. The device of claim 11 wherein said stripper plate is adapted to be projected forward by hydraulic means.

15. The device of claim 11 wherein the outer surface of said stripper plate and the outer portions of said drive fingers are adapted to be located immediately adjacent the surface of said cutting means at the end of the cutting cycle.

16. The device of claim 11 wherein said stripper plate assembly is rotatable around the axis of said potato prong-holding means.

17. The device of claim 11 wherein said stripper plate assembly is adapted to move rotably forward progressively forcing thereby an entire potato against said cutting means, and wherein said cutting means are adapted to cut substantially the entire potato during a cutting operation.

* * * * *